United States Patent
Ahmed et al.

(10) Patent No.: US 6,774,912 B1
(45) Date of Patent: Aug. 10, 2004

(54) MULTIPLE DISPLAY DEVICE DISPLAY CONTROLLER WITH VIDEO OVERLAY AND FULL SCREEN VIDEO OUTPUTS

(75) Inventors: Kamran Ahmed, Montreal (CA); Alexandre Lahaise, Pierrefonds (CA); Gilles Forest, Blainville (CA); Yves Tremblay, Pointe-Claire (CA); Lorne Trottier, Beaconsfield (CA)

(73) Assignee: Matrox Graphics Inc., Dorval (CA)

( * ) Notice: Subject to any disclaimer, the term of this patent is extended or adjusted under 35 U.S.C. 154(b) by 0 days.

(21) Appl. No.: 09/526,440

(22) Filed: Mar. 16, 2000

(51) Int. Cl.[7] ............................................. G09G 5/00
(52) U.S. Cl. .................... 345/629; 345/1.1; 345/2.1; 345/2.2; 345/3.1; 345/3.2; 345/634; 345/635; 345/751; 345/753; 345/759; 348/14.03; 348/14.07
(58) Field of Search .................... 345/1.1, 2.1, 2.2, 345/3.1, 3.2, 629, 634, 635, 751, 753, 759; 348/14.03, 14.07

(56) References Cited

U.S. PATENT DOCUMENTS

| | | |
|---|---|---|
| 4,875,173 A | 10/1989 | Nakajima |
| 4,926,166 A | 5/1990 | Fujisawa et al. |
| 5,125,043 A | 6/1992 | Karlsson |
| 5,150,109 A | 9/1992 | Berry |
| 5,172,103 A | 12/1992 | Kita |
| 5,187,776 A | 2/1993 | Yanker |
| 5,195,174 A | 3/1993 | Kagawa |
| 5,227,771 A | 7/1993 | Kerr et al. |
| 5,327,156 A | 7/1994 | Masukane et al. |
| 5,479,184 A | 12/1995 | Tokumitsu |
| 5,488,385 A | 1/1996 | Singhal et al. |
| 5,539,426 A | 7/1996 | Nishikawa et al. |
| 5,585,821 A | 12/1996 | Ishikura et al. |
| 5,590,254 A * | 12/1996 | Lippincott et al. ........... 345/634 |
| 5,596,346 A | 1/1997 | Leone et al. |
| 5,710,570 A | 1/1998 | Wada et al. |
| 5,748,044 A | 5/1998 | Xue |
| 5,764,201 A * | 6/1998 | Ranganathan ................ 345/3.3 |
| 5,767,834 A | 6/1998 | Vouri et al. |
| 5,805,132 A | 9/1998 | Imaizumi et al. |
| 5,841,418 A | 11/1998 | Bril et al. |
| 5,874,928 A | 2/1999 | Kou |
| 5,877,741 A * | 3/1999 | Chee et al. .................. 345/629 |
| 5,880,709 A | 3/1999 | Itai et al. |
| 5,889,499 A * | 3/1999 | Nally et al. ..................... 345/7 |
| 5,910,795 A | 6/1999 | Whittaker |
| 5,923,791 A * | 7/1999 | Hanna et al. ................ 382/295 |
| 5,940,089 A * | 8/1999 | Dilliplane et al. ........... 345/553 |
| 5,977,933 A * | 11/1999 | Wicher et al. ................ 345/3.1 |
| 6,018,340 A | 1/2000 | Butler et al. |
| 6,020,863 A | 2/2000 | Taylor |
| 6,028,585 A | 2/2000 | Ishii et al. |
| 6,084,565 A | 7/2000 | Kiya |
| 6,118,461 A * | 9/2000 | Taylor ......................... 345/520 |
| 6,400,374 B2 * | 6/2002 | Lanier ......................... 345/630 |

* cited by examiner

Primary Examiner—Matthew C. Bella
Assistant Examiner—Mike Rahmjoo
(74) Attorney, Agent, or Firm—James Anglehart; Alexandra Daoud; Ogilvy Renault

(57) ABSTRACT

Multiple independent displays from one graphics controller can be driven in a wide variety of modes using multiple display controllers. This invention incorporates a unique combination of enhancement building on a generic single multi-display graphics subsystem. Digital video is gaining vast popularity in the worldwide consumer, professional and commercial market. The applications of this invention cover all these market segments and include (but are not limited to) Digital Content Creation, Digital video playback, digital entertainment, DVD Authoring etc.

21 Claims, 8 Drawing Sheets

MULTIPLE DISPLAY DEVICE DISPLAY CONTROLLER WITH VIDEO OVERLAY AND FULL SCREEN VIDEO OUTPUTS

This application is related to a commonly assigned co-pending application filed simultaneously herewith entitled "VIDEO DISPLAY SYSTEM WITH TWO CONTROLLERS EACH ABLE TO SCALE AND BLEND RGB AND YUV SURFACES", the specification of which is hereby incorporated by reference.

FIELD OF THE INVENTION

The present invention relates to a single controller system for multiple display output including motion video output.

BACKGROUND OF THE INVENTION

Video display controllers are known which are able to work with both RGB pixel format and YUV pixel format to combine two display surfaces from graphics memory to provide an overlay output. This is useful, for example, in the situation that a movie source in YUV format is obtained by decoding a video file from say a CD-ROM or DVD device, and written to a video surface in graphics memory. At the same time a computer environment desktop is stored in RGB format in another surface within graphics memory. These two surfaces can be combined to provide the YUV source within a window on the desktop. Because the video display controller handles the conversion, scaling and mixing of the two sources, the computer operating system or application program does not directly create the desired display, but rather instructs the display controller system to scale and combine the two sources as desired. The quality of display and efficiency of the computer system is thereby greatly enhanced.

In such display controller systems capable of supporting dual display output, when YUV pixel format video is overlaid or blended with a graphics or RGB surface, both displays operate in a simultaneous mode in which the same output is shown on both displays. Therefore only one combined output of mixed format video is possible in which case the second output can only mirror what is being displayed by the first output.

It has been found that it would be desirable to provide full screen motion video output on a display device such as for example a TV while at the same time providing a computer desktop display in which the motion video is displayed overlaid within a window on the desktop surface. The state of the art display controller systems are not able to provide such operation within one graphic controller system having a single memory subsystem While possible to make use of two display controller systems which both must be controlled to share the computer's resources to provide the desired dual display output, this is not known in the art, because of various limiting factors, including cost, strain on the computer's resources and the need to control and synchronize the two display controller systems at the driver level and possibly also at the application or operating system level.

SUMMARY OF THE INVENTION

It is a general object of the present invention to provide a display controller apparatus for multiple display devices, the apparatus being able to output motion video on one display at the same time as a computer desktop is output on another display, in which drawbacks of the prior art are overcome.

Firstly, it is an object to provide a display device controller apparatus able to provide motion video overlay on a first desktop display, while at the same time provide full screen the motion video on a second display. Secondly, it is an object to provide a display device controller apparatus able to provide an automatic control for outputting full screen the motion video on a second display when a request is made to provide an overlay. Thirdly, it is an object to provide a display device controller apparatus able to automatically determine whether scaling is required to provide full screen motion video output, and if scaling functionality is available then invoking scaling, and otherwise padding or cropping the motion video before outputting to the second display. Fourthly, it is an object to provide a display device controller apparatus having sufficient 2D or 3D drawing engine capability that scaling, overlaying and/or blending of motion video can be done in video memory without having to rely on dedicated scalers, multiplexers or blending units in each display controller path to provide those image processing functions. The invention provides both a display controller apparatus as well as a method for providing a multiple display device output and a method for controlling a display controller apparatus.

According to the invention, there is provided a multiple display device display controller apparatus comprising a video memory containing a main display surface and a YUV format video surface, a first display controller accessing the main display surface and the YUV format video surface and outputting a display signal, the first display controller including a scaler unit and an overlaying unit for overlaying the YUV format video surface on the main display surface, and a second display controller accessing the YUV format video surface from the video memory and outputting a display signal to provide full screen output. Advantageously, the apparatus also preferably detects an overlay request from the application decoding the video, or an equivalent indication from the computer that a user has requested the display of motion video in a window of the desktop. In response to the detection of the overlay request, the apparatus overlays the YUV format video surface with the at least one other surface, and the second display controller is caused to automatically access the YUV format video surface and output full screen video from the YUV format video surface.

According to the invention, there is also provided a method of controlling a display controller apparatus connected to a computer and having at least two display device outputs. The method comprises the steps of:

detecting an overlay request generated in the computer, the overlay request indicating that a YUV format video surface is to be overlaid over a main display surface;

responsive to the detecting of the overlay request, causing the apparatus to access the YUV format video surface and to provide full screen output of the YUV format video surface on one of the at least two device outputs; and causing the main display surface to be output on another of the at least two device outputs with a window portion of the main display surface intended to contain the YUV format video being one of minimized and blanked.

According to the invention, there is further provided a method of controlling a display controller apparatus connected to a computer and having at least two display device outputs. The method comprises the steps of:

storing in a video memory of said apparatus a main display surface and a YUV format video surface;

causing a first display controller of said apparatus to access said main display surface and said YUV format video surface and to output a display signal to a first display, the first display controller including a scaler unit and an overlaying unit;

causing said first display controller to overlay said YUV format video surface on said main display surface; and causing a second display controller to access said YUV format video surface from said video memory and to output a display signal providing full screen output to a second display.

Preferably, the method according to the invention further comprises detecting a resolution of the YUV format video surface and determining whether the YUV format video surface requires scaling. In one embodiment, when scaling is required, the YUV format video surface is caused to be scaled. However, in another embodiment, when scaling is required, the full screen output of the YUV format video surface is not implemented. In this case, when the controller apparatus does not have scaling capacity and the YUV video is not in a same resolution as the display device connected to the one of the device outputs, automatic full screen video output is not performed. In a further embodiment, when scaling is required, the YUV format video surface is caused to be padded or cropped, as needed. In this embodiment, the controller apparatus does not have scaling capacity and the YUV video is not in a same resolution as the display device connected to the one of the device outputs, full screen video output is performed with padding or cropping.

It is also preferable that the second display controller be caused to stop displaying a surface other than the YUV format video surface and to begin displaying the YUV format video surface when the overlay request is detected. The full screen display is preferably a TV, and the YUV format video surface may be obtained from a full resolution DVD (MPEG-2) source. In this way, the YUV format video surface does not typically require scaling and the full screen output on the TV is performed.

It is also preferable that either controller have blending capabilities so that motion video over graphics overlay and graphics over motion video blending can be performed.

BRIEF DESCRIPTION OF THE DRAWINGS

The invention will be better understood by way of the following non-limiting detailed description of a number of preferred embodiments with reference to the appended drawings, in which.

DETAILED DESCRIPTION OF THE PREFERRED EMBODIMENTS

According to the invention, a display controller apparatus is provided which contains at least two display controllers for providing a display signal output to at least two independent display devices. While in the preferred embodiments, two display controllers and two display signal outputs are illustrated, it will be appreciated that the invention may be applied to display controller apparatus in which three or more displays are provided.

Figure 1:
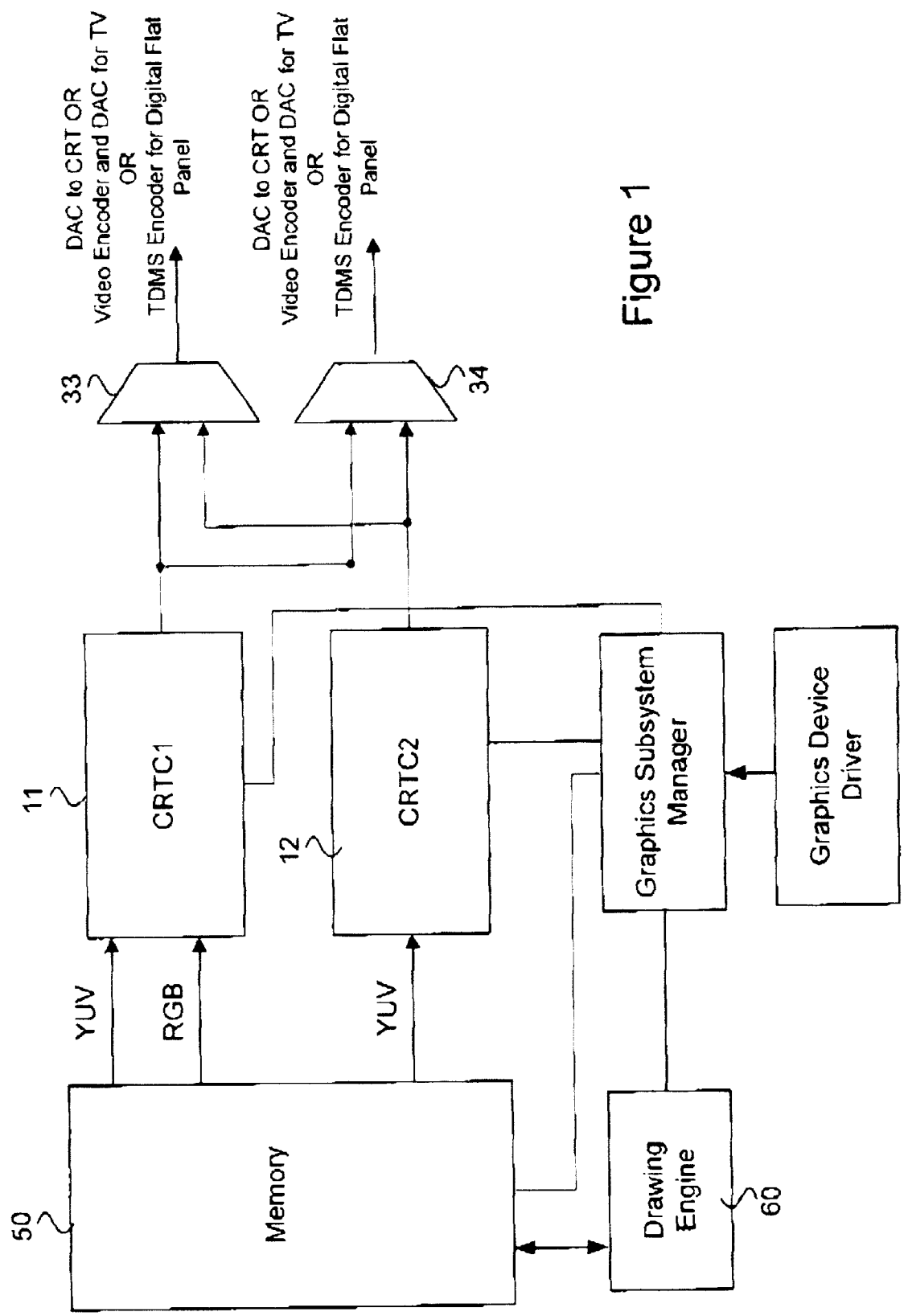
FIG. 1 is a schematic block diagram of a graphics subsystem having two display controllers, one for outputting motion video (YUV format) in a full screen mode, and another controller for overlaying the motion video on a graphics surface (RGB format)

As illustrated in FIG. 1, a display controller apparatus has a video memory 50 in which a number of surfaces may be stored. In the embodiment illustrated in FIG. 1, the surfaces comprise at least two different pixel formats, namely an RGB pixel format surface representing the computer desktop and a YUV pixel format surface storing motion video which is either retrieved directly from fixed storage or generated by a video codec. The computer includes a graphic device driver which communicates with the graphics subsystem manager for controlling the cathode ray tube controllers (CRTCs) CRTC1 and CRTC2 labeled in FIG. 1 as devices 11 and 12.

A drawing engine 60 is also included in the display controller apparatus. Drawing engines are known in the art and may have various processing powers. Drawing engines may be relatively simple, such as the drawing engines for the purposes of preparing graphic displays such as a desktop which is composed of text and icons as well as a hardware cursor which can be generated using the 2D drawing engine. In the case of more sophisticated graphics, it is known to provide a 3D drawing engine. A 3D drawing engine, in accordance with the invention, can also be used for scaling, overlaying or blending purposes of 2D motion video images.

As illustrated in FIG. 1, CRTC1 reads a YUV surface and an RGB surface and may output a YUV overlay on the RGB surface. For example, this may be a desktop with a video window contained within the desktop. The second controller 12 in the embodiment of FIG. 1 receives only the same YUV surface and outputs it with or without scaling for full screen video output.

Figure 2:
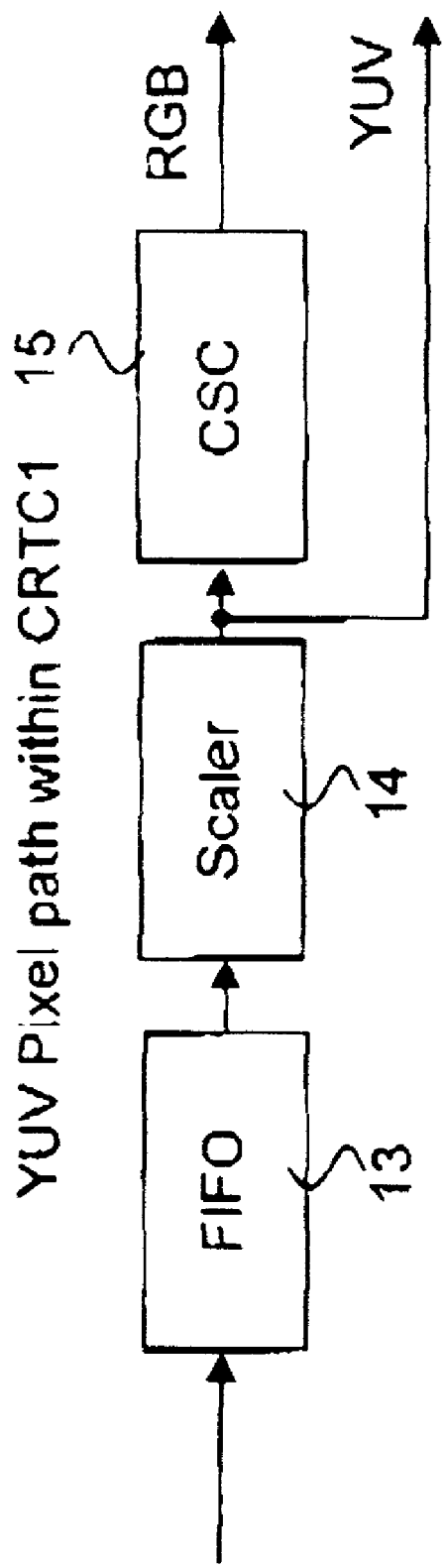
FIG. 2 is a schematic block diagram of the YUV pixel path in the other controller, CRTC1.

As illustrated in FIG. 2, the YUV pixel path within CRTC1 includes a FIFO 13, a scaler 14 and a color space converter 15 in order to convert the YUV pixel format data into RGB pixel format data for the purposes of the subsequent overlaying or blending and scaling to fit the window if necessary. The overlaying unit, not shown in the FIGS. 1 or 2, may comprise as a minimum a multiplexer, but can also comprise a blending unit which is able to blend two surfaces in accordance with the alpha data of the pixel data. When overlay is desired, the alpha data is set to cause overlay with no blending. The second overlay surface can be a graphic bitmap or other type of surface. Typically, but not exclusively, this is used to display a DVD sub-picture overlay surface over a DVD decoded picture. For example, the secondary display controller's main surface could either be in YUV (4:4:4, 4:2:2, 4:1:1, 4:2:0) or YCbCr (4:4:4, 4:2:2, 4:1:1, 4:2:0) or RGBalpha (8, 16, 24, 32 bpp) format which allows for various types of surfaces to be displayed (grabbed video from video input port, S/W decoded video, graphic images etc.).

The output of the first display controller 11 and the second display controller 12 are each fed into multiplexers 33 and 34 in order to allow for the respective outputs to be switched between the two displays. Not illustrated in FIG. 1 are the two displays as well as the DAC to CRT or video encoder and DAC for TV or TDMS encoder for digital flat panels. These components are known to a person skilled in the art and are not described in detail herein.

Figure 3:
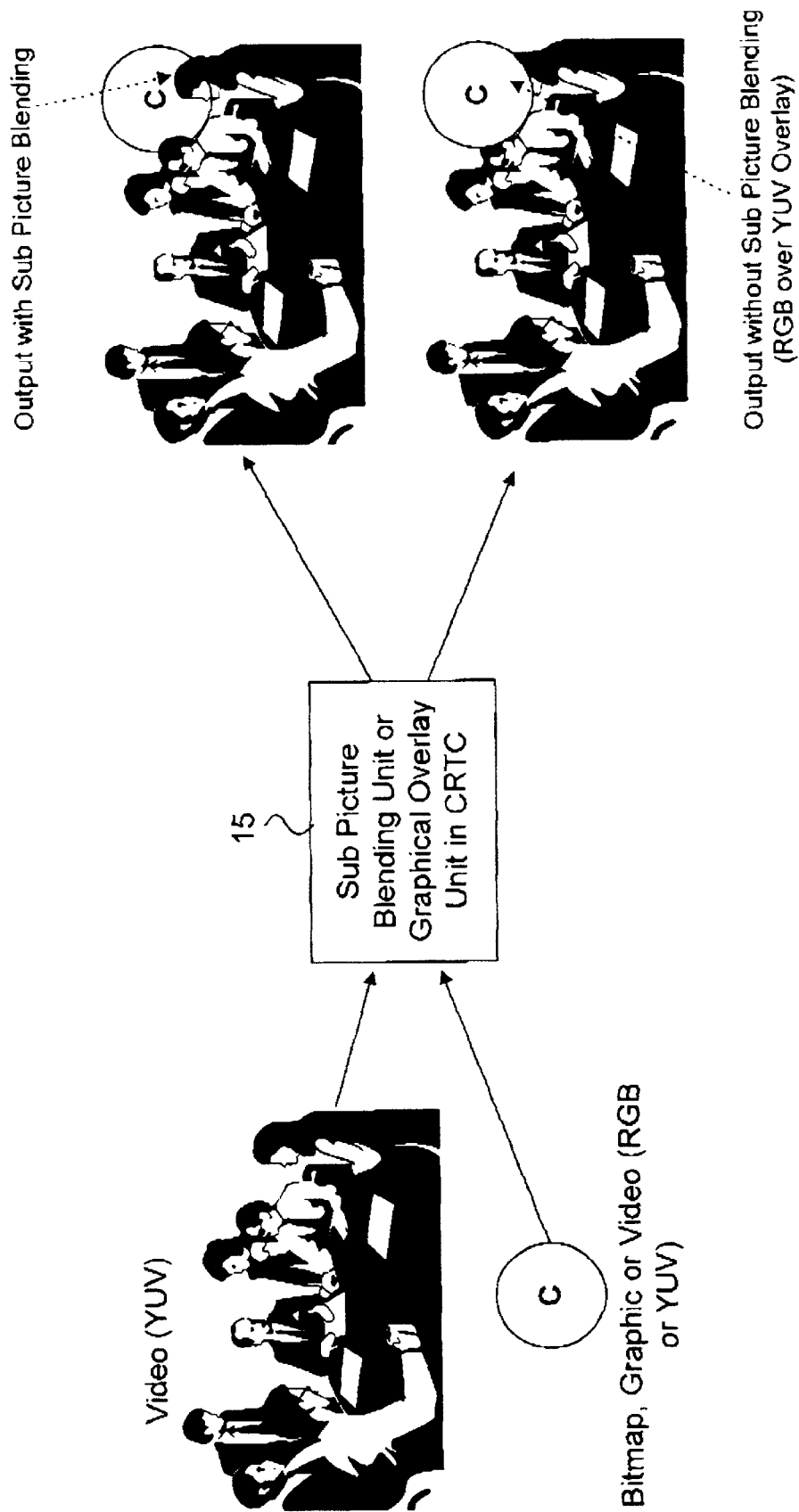
FIG. 3 is an illustration of two image surfaces and the results of sub-picture blending and of an overlay.

As illustrated in FIG. 3, CRTC1 and/or CRTC2 can be provided with a sub-picture blending unit 15 which is capable of being operated either to provide overlay or blending as illustrated in FIG. 3. The sub-picture blending unit 15 contained within CRTC1 has the ability to overlay one surface over another. In the illustration of FIG. 3 a logo identified as the letter C is either blended or overlaid within a video surface. The blending unit will blend an RGB surface over a YUV surface. Alternatively, the sub-picture blending unit blends, or more typically overlays, the YUV video surface onto the main display buffer to generate the display. One application of this would be adding logos, subtitles etc. In the case of DVDs (as an example) where the language of the subtitles is user selectable, the sub-titles are not embedded in the source of the YUV surface but are overlaid in real-time from a user selectable source.

Figure 4:
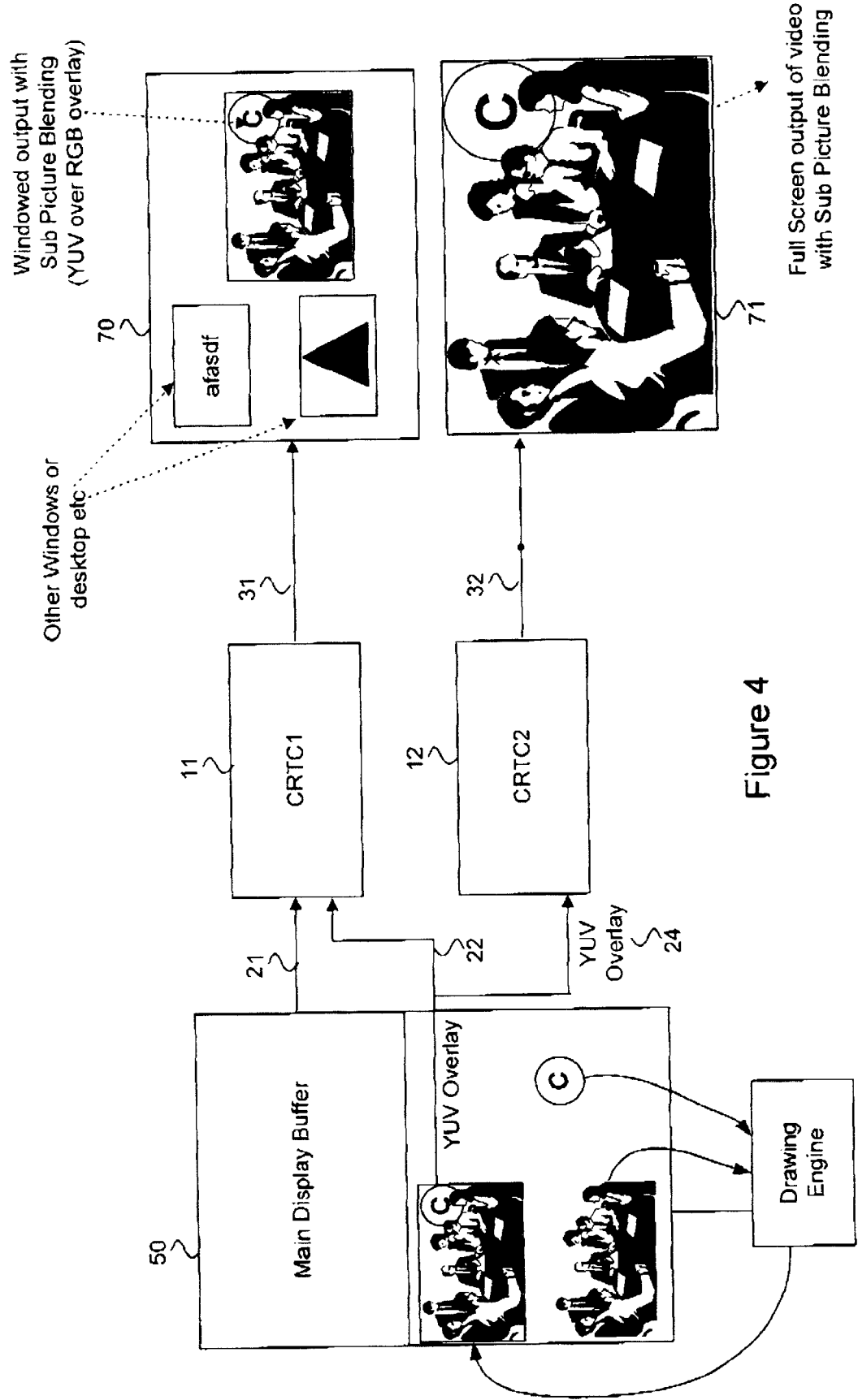
FIG. 4 is a schematic block diagram of an embodiment in which the 3D drawing engine is used to scale a DVD YUV surface and/or blend a graphic surface to create a YUV overlay surface for the first display and/or second display.

In the embodiment of FIG. 4, the YUV surface is processed by the drawing engine 60 in order to blend using the 3D drawing engine capability within the display controller apparatus to create a blended YUV surface. This blended surface is like the one which could also be achieved using a blending unit 15 as illustrated in FIG. 3, namely the logo is blended with the source video surface to generate the YUV overlay surface which is then read for display by CRTC2 in full screen output 71 and separately read by CRTC1 for display within a window in the desktop.

Figure 5:
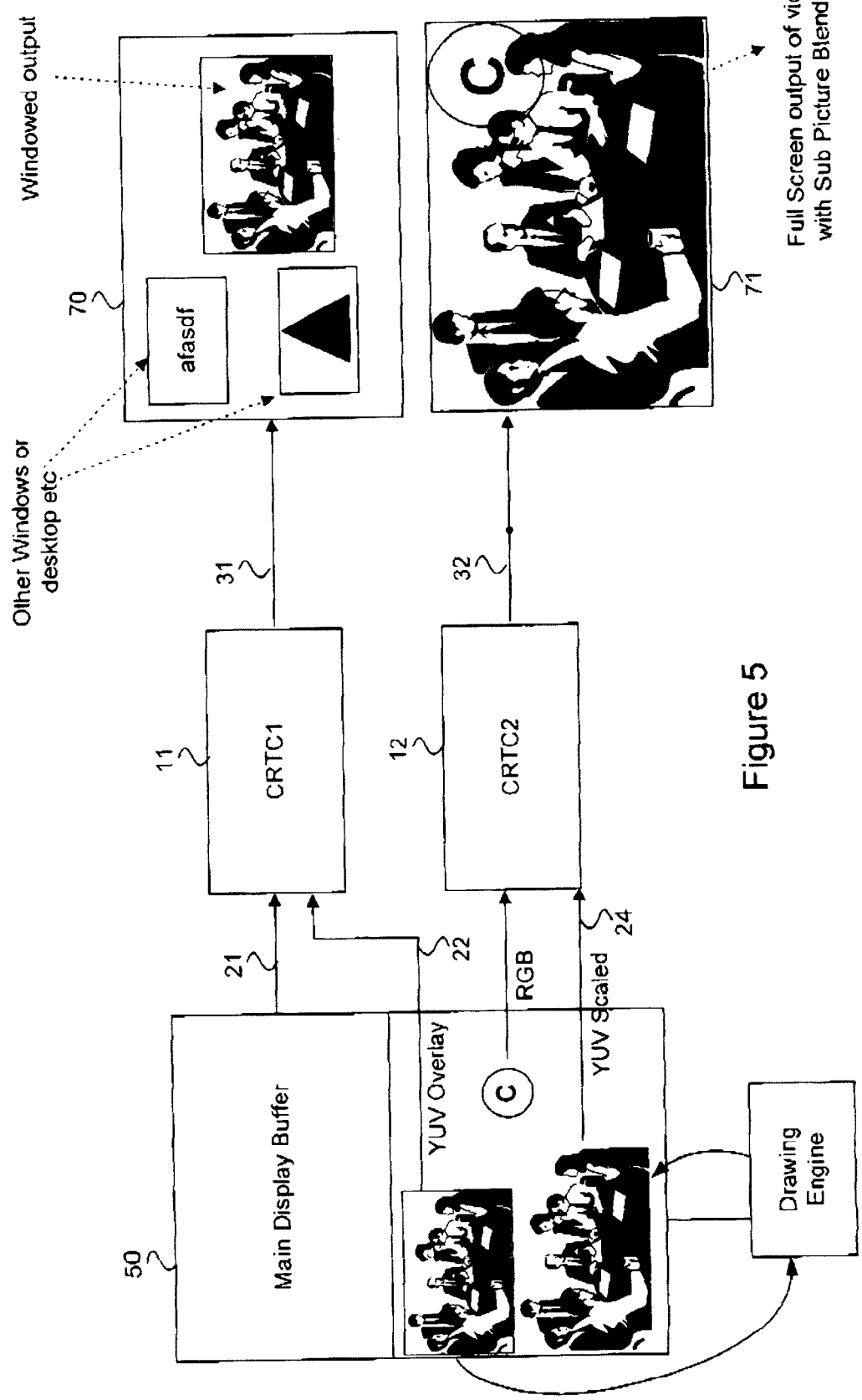
FIG. 5 is a schematic block diagram of an embodiment in which the 3D drawing engine is used to scale a YUV surface to create a scaled full screen YUV surface for the second display, and the second controller which has blending capabilities reads an additional graphics surface, blends it with the full screen YUV surface before producing full screen output on the display.

In the embodiment of FIG. 5, the YUV surface is processed by the drawing engine 60 in order to scale using the 3D drawing engine capability within the display controller apparatus to create a scaled YUV surface. CRTC2 which has blending unit reads this surface and combines it with an another graphics surface to create a blended surface. This blended surface is like the one which is achieved using a blending unit 15 as illustrated in FIG. 3, namely the logo is blended with the source video surface to generate the blended surface which is then displayed by CRTC2 in full screen output 71. It will be appreciated that this can be done irrespective of whether CRTC1 has blending capabilities or not in the latter case the YUV surface in memory (non blended) is separately read by CRTC1 for display within a window in the desktop.

Figure 6:
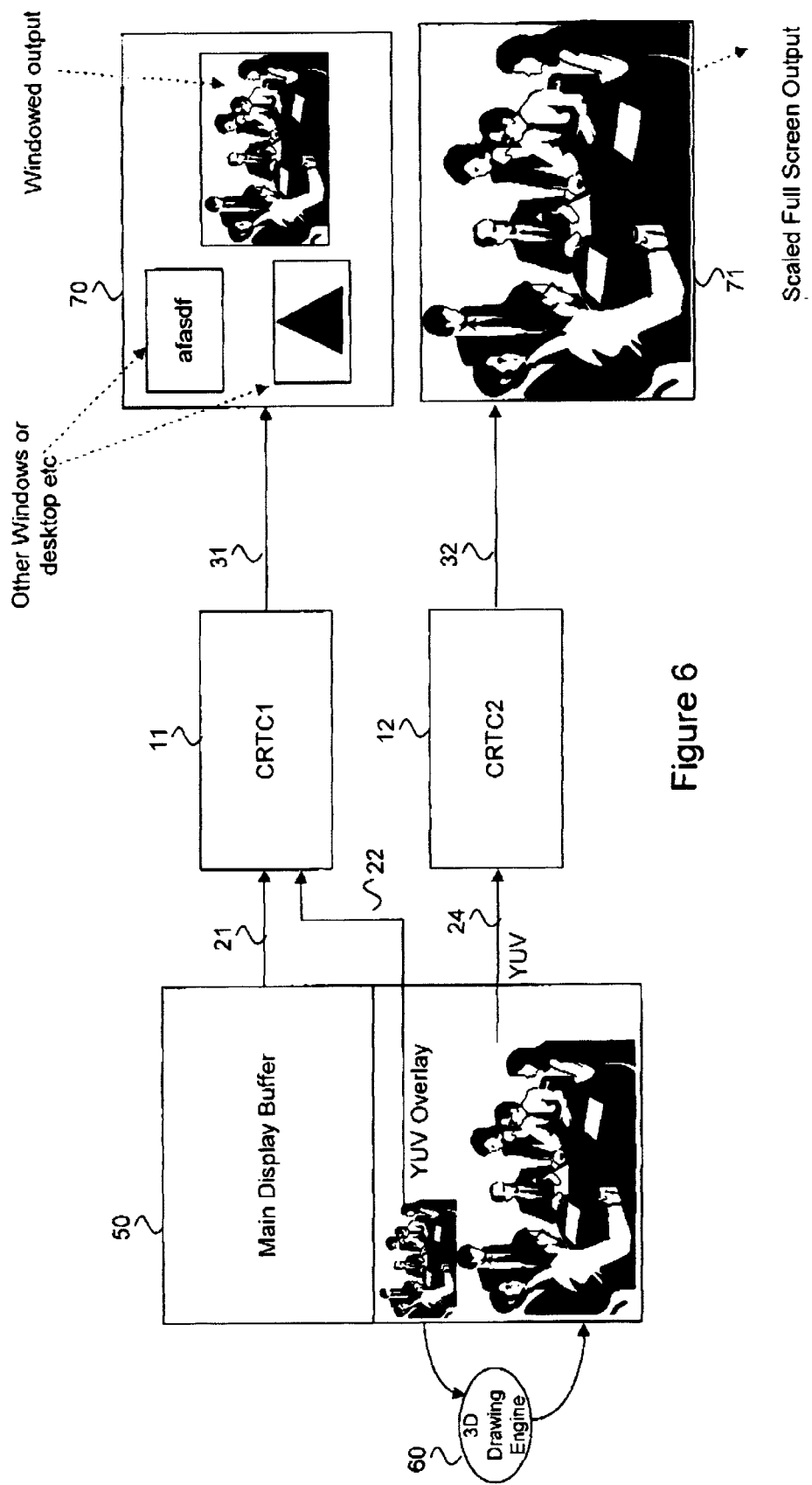
FIG. 6 is a schematic block diagram of an embodiment in which the 3D drawing engine is used to scale a motion video source which is not in full screen resolution to be in full screen resolution for display on the second display.
Figure 7:
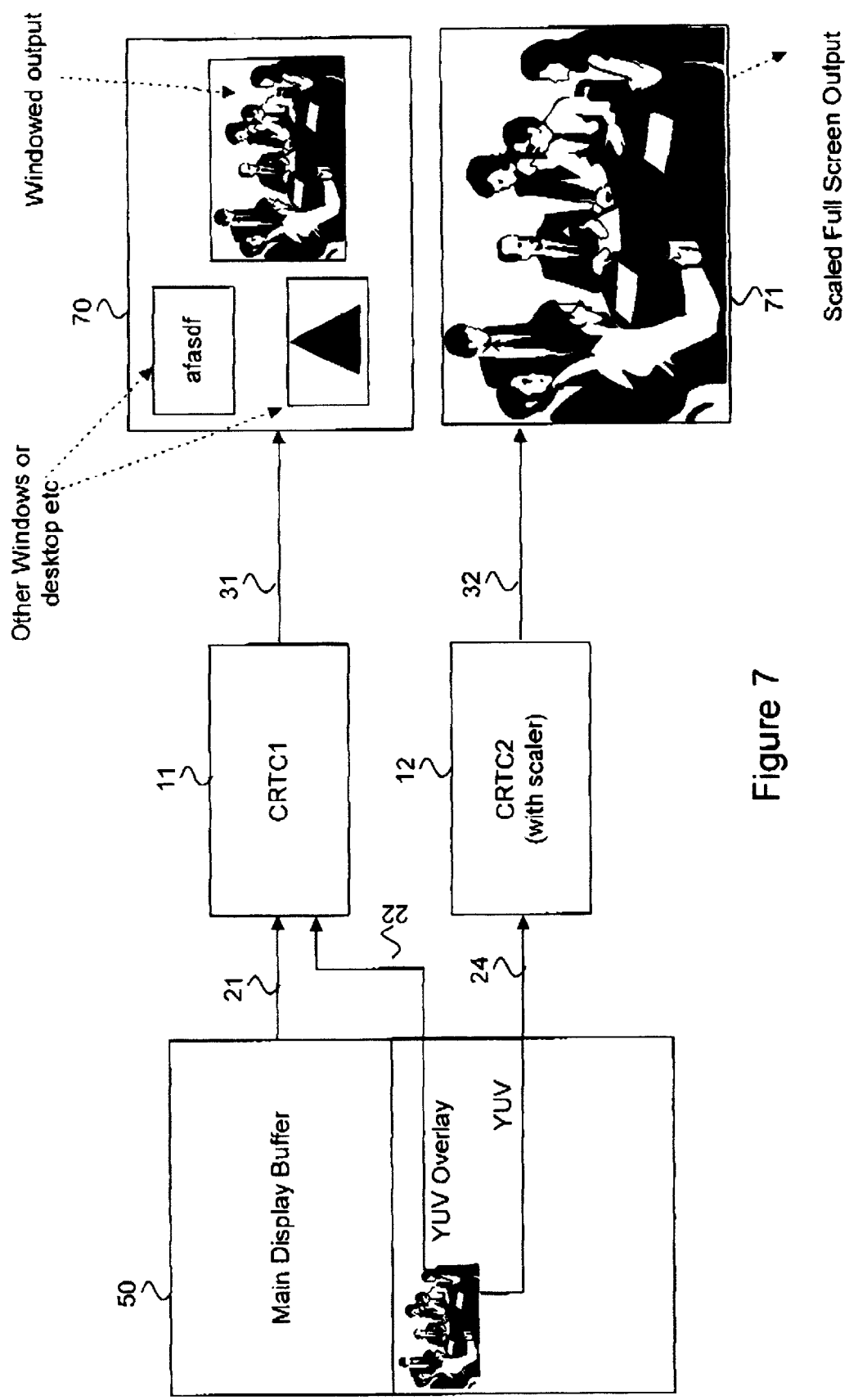
FIG. 7 is a schematic block diagram of an embodiment in which a backend scaler in the second controller is used to scale a motion video source which is not in full screen resolution to be in full screen resolution for display on the second display.

In the embodiment of FIG. 6, the YUV source surface is not of the appropriate resolution for full screen display on the second display 71. The 3D drawing engine 60 is used to scale the YUV overlay surface to be full screen for display 71, and the scaled surface is read by path 24 and CRTC2 outputs display signal 32 for full screen output 71. The YUV source surface in memory 50 is read by the first display controller 11 along with the main display buffer 21. The CRTC1 scales the YUV overlay surface and overlays it on the main display buffer to provide output signal 31 resulting in display 70. This is useful when CRTC2 does not have a scaling unit In the embodiment of FIG. 7, CRTC2 includes a back end scaler and the use of the 30 drawing engine to provide a scaled copy in the correct resolution for full screen display within memory 50 is not required.

Figure 8:
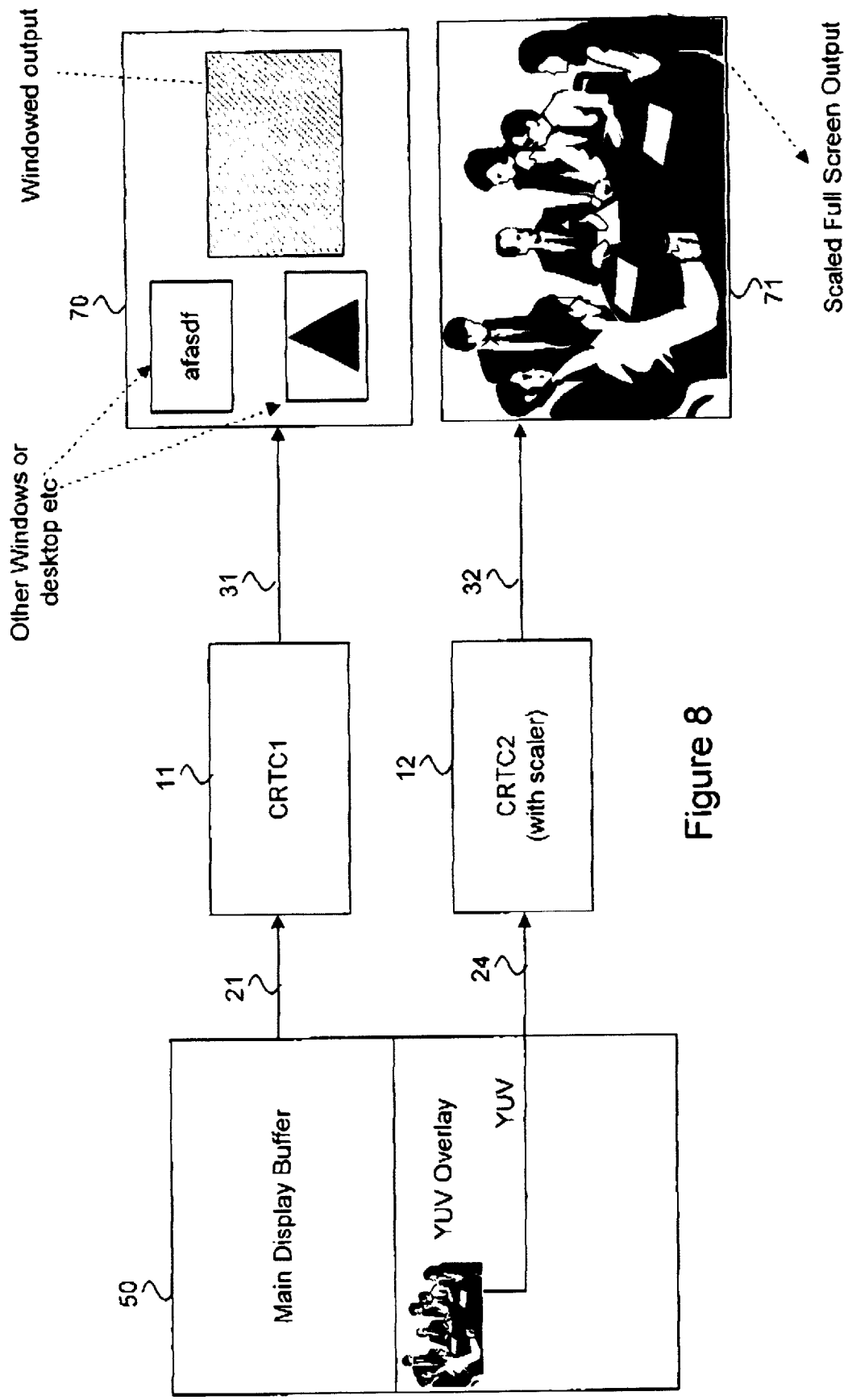
FIG. 8 is a schematic block diagram of an embodiment in which the first controller does not have any overlay and/or scaling capability, and outputs a blanked window instead of overlaid video, and the YUV video surface is scaled in the second controller and output in full screen resolution.

In the embodiment of FIG. 8, the first display controller 11 is not provided with overlay capability. Therefore, the main display buffer is displayed with a blank window where the motion video would normally be overlaid. The YUV overlay surface in memory 50 is read over path 24 by the second display controller which, in the embodiment of FIG. 8, is provided with a scaler for scaling, if necessary, the YUV surface for full screen output.

In all of the preferred embodiments, the graphics device driver is adapted to respond to an overlay request in the following manner. When a user runs any video that requests an overlay from the graphics subsystem, full screen output on the secondary display can thus automatically be enabled. Firstly, the graphics device driver will determine whether the YUV overlay video source is of a resolution appropriate for full screen output on the display which is designated as being the second display for full screen motion video output. If scaling is required, then the graphics device driver will ascertain whether scaling resources are available. Scaling resources may be available either in the form of a backend scaler within CRTC2 or by invoking a scaling operation by the drawing engine 60. If no scaling capabilities are available, the graphics device driver may either abort the full screen output or proceed nonetheless with outputting the YUV video by padding the video source or by cropping, as the case may be The padding and/or cropping functions could be carried out by the device driver itself or by invoking functions of the drawing engine, for example.

Once the graphics device driver has ascertained how the best full screen output can be provided for the YUV surface to the second display 71, the driver sends the appropriate control signals to the graphics sub-system. For example, if the second display controller 12 was previously displaying a different surface of memory 50 or, the CRTC2 can be commanded to abandon its previous displaying functions and immediately begin reading the appropriate YUV surface in order to display in full screen the YUV surface which was the subject of the overlay request.

In the case that the first display controller 11 does not have an overlay capability, the graphics device driver preferably attempts to minimize the window in which the overlay video would normally appear so that the blank window does not even appear on the desktop. In some cases, the window is separate from a video playback control window, and such minimizing is practical. In the case that the video overlay window is integrated with the controls window, it may be desirable not to minimize the window, and simply display the blanked video window. It may also be advantageous to cause the overlay window to be minimized in the case that the drawing engine capabilities of the display controller apparatus is to be used in the generation of both display 70 and display 71, in which case the minimizing of the overlay window of display 70 will reduce the computational efforts of the 3D drawing engine and improve performance in the scaled full screen output.

Many options regarding the functionality of the driver and the apparatus are possible according to the invention, and therefore a user control interface (GUI) to select control options is contemplated according to the preferred embodiment. Such controls may include whether drawing engine scaling is enabled, whether automatic detection of an overlay request should cause the driver to control the second controller to output full screen video only if the second controller is not in use or, even if the second controller is in use, to interrupt the second controller to change its output to the full screen video, whether cropped or padded full screen output is enabled (particularly when no scaling is available), whether a lack of scaling for the full screen video when no scaling is available results in no automatic video output, etc.

In the last case that scaling is required for full screen video output, no scaling is available for the second controller, and the first controller has scaling ability, then it is possible to use the first controller to scale and output the YUV path only, switch it to the second display, and read the main surface with the second controller with no overlay and switch its output to the first display. This allows the apparatus to provide the full screen output using the scaling ability of the first controller and using the multiplexing ability of the multiplexers.

It will be appreciated it that but a few of the possible embodiments have been described herein above and that many variations and different configurations are possible within the scope of the present invention as better defined in the appended claims.

What is claimed is:

1. A method of controlling a display controller apparatus connected to a computer and having at least two display device outputs, comprising the steps of:

storing in a video memory of said apparatus a main display surface and a YUV format video surface;

causing a first display controller of said apparatus to access said main display surface and said YUV format video surface and to output a display signal to a first display, the first display controller including a scaler unit and an overlaying unit;

causing said first display controller to overlay said YUV format video surface within said main display surface;

detecting an overlay request generated in said computer, said overlay request indicating that a YUV format video surface is to be overlaid over a main display surface;

responsive to said detecting of said overlay request, causing a second display controller to access said YUV format video surface from said video memory and to output a display signal providing full screen output to a second display, wherein said output to a first display and said output to a second display occur substantially simultaneously;

wherein said second display controller is caused to stop displaying a surface other than said YUV format video surface and to begin displaying said YUV format video surface when said overlay request is detected.

2. The method as claimed in claim 1, further comprising:

detecting a resolution of said YUV format video surface and determining whether said YUV format video surface requires scaling to cause said full screen output onto said second display.

3. The method as claimed in claim 2, wherein when scaling is required, said YUV format video surface is caused to be scaled.

4. The method as claimed in claim 2, wherein when scaling is required, said full screen output of said YUV format video surface is not implemented, whereby when said controller apparatus does not have scaling capacity and said YUV video is not in a same resolution as the second display, automatic full screen video output is not performed.

5. The method as claimed in claim 4, wherein said second display is a TV, and said YUV format video surface is obtained from a full TV resolution DVD source, whereby said YUV format video surface does not require scaling and said full screen output on said TV is performed.

6. The method as claimed in claim 2, wherein when scaling is required, said YUV format video surface is caused to be one of padded and cropped, whereby when said controller apparatus does not have scaling capacity and said YUV video is not in a same resolution as the second display, full screen video output is performed with padding or cropping.

7. The method as claimed in claim 3, wherein second display controller comprises a backend scaler having said YUV format video surface as input and outputting a full screen scaled version of said YUV format video surface, wherein said backend scaler adjusts a native format video surface to be full screen.

8. The method as claimed in claim 3, wherein said apparatus comprises a drawing engine reading and processing said video memory to read said YUV format video surface and write a scaled version of said YUV format video surface in said video memory, said scaling comprising causing said drawing engine to scale said YUV format video to provide said scaled version of said YUV format video surface suitable for said full screen output said second display controller accessing said scaled version of said YUV format video surface and thus providing said full screen output.

9. The method as claimed in claim 1, wherein said scaler unit comprises a backend scaler having said YUV format video surface as input and outputting a scaled version of said YUV format video surface, said scaling being performed by said backend scaler.

10. The method as claimed in claim 1, wherein said scaler unit comprises a drawing engine reading and processing said video memory, the method comprising causing said drawing engine to read said YUV format video surface and to write a scaled version of said YUV format video surface in said video memory, said first display controller accessing said scaled version of said YUV format video surface.

11. The method as claimed in claim 1, wherein said overlaying unit comprises a blending unit having a setting for overlaying at least said YUV format video surface on said main display surface, said first display controller being controlled to perform overlaying and sub-picture blending.

12. The method as claimed in claim 1, wherein second display controller accesses a further surface from said video memory and comprises a format converter for converting, if necessary, one of said further surface and said YUV format video surface, and a blending unit overlaying or blending said YUV format video surface and said other surface, said second display controller being controlled to perform sub-picture blending and/or overlay.

13. A multiple display device display controller apparatus comprising:

a video memory containing a main display surface and a YUV format video surface;

a first display controller accessing said main display surface and said YUV format video surface and outputting a first display signal, the first display controller including a scaler unit and an overlaying unit for overlaying said YUV format video surface within said main display surface; and a second display controller accessing said YUV format video surface from said video memory and outputting a second display signal to provide full screen output, wherein said first and second display signals are outputted substantially simultaneously to a first and a second display device, respectively;

wherein said apparatus communicates with a driver detecting an overlay request and said apparatus being responsive to an overlay request signal received from said driver to overlay said YUV format video surface with said at least one other surface, and said second display controller is responsive to said overlay request signal to automatically access said YUV format video surface and output full screen video from said YUV format video surface; and wherein said second display controller stops displaying a surface other than said YUV format video surface and begins displaying said YUV format video surface in response to said overlay request signal.

14. The apparatus as claimed in claim 13, wherein said second display controller outputs to a TV encoder, and said YUV format video surface is obtained from a full TV resolution DVD source, whereby said YUV format video surface does not require scaling and said full screen output on said TV is performed.

15. A method of controlling a display controller apparatus connected to a computer and having at least two display device outputs, comprising the steps of:

detecting an overlay request generated in said computer, said overlay request indicating that a YUV format video surface is to be overlaid within a main display surface;

responsive to said detecting of said overlay request, causing said apparatus to access said YUV format video surface and to provide full screen output of said YUV format video surface on one of said at least two device outputs; and causing said main display surface to be output on another of said at least two device outputs with a window portion of said main display surface intended to contain said YUV format video being one of minimized and blanked, wherein said full screen output and said main display surface containing one of a minimized and blanked YUV format video are output substantially simultaneously;

wherein said apparatus is caused to stop displaying a surface other than said YUV format video surface on said one of said at least two device outputs and to begin displaying said YUV format video surface when said overlay request is detected on said one of said at least two device outputs.

16. The method as claimed in claim 15, further comprising detecting a resolution of said YUV format video surface and determining whether said YUV format video surface requires scaling.

17. The method as claimed in claim 16, wherein when scaling is required, said YUV format video surface is caused to be scaled.

18. The method as claimed in claim 16, wherein when scaling is required, said full screen output of said YUV format video surface is not implemented, whereby when said controller apparatus does not have scaling capacity and said YUV video is not in a same resolution as the display device connected to the one of the device outputs, automatic full screen video output is not performed.

19. The method as claimed in claim 16, wherein when scaling is required, said YUV format video surface is caused to be one of padded and cropped, whereby when said controller apparatus does not have scaling capacity and said YUV video is not in a same resolution as the display device connected to the one of the device outputs, full screen video output is performed with padding or cropping.

20. The method as claimed in claim 15, wherein second display controller accesses a further surface from said video memory and comprises a format converter for converting, if necessary, one of said further surface and said YUV format video surface, and a blending unit overlaying or blending said YUV format video surface and said other surface, said second display controller being controlled to perform sub-picture blending and/or overlay.

21. The method as claimed in claim 17, wherein said apparatus comprises a drawing engine reading and processing said video memory to read said YUV format video surface and write a scaled version of said YUV format video surface in said video memory, said scaling comprising causing said drawing engine to scale said YUV format video to provide said scaled version of said YUV format video surface suitable for said full screen output, said second display controller accessing said scaled version of said YUV format video surface and thus providing said full screen output.

* * * * *